(12) United States Patent
Georges et al.

(10) Patent No.: US 10,955,099 B2
(45) Date of Patent: Mar. 23, 2021

(54) CONCEALED LIGHTHEAD WITH INDICATOR OVERRIDE

(71) Applicant: Hella Automotive Sales, Inc., Peachtree City, GA (US)

(72) Inventors: Urs Maria Georges, Peachtree City, GA (US); Jeffrey Meir Hanina, Parkland, FL (US)

(*) Notice: Subject to any disclaimer, the term of this patent is extended or adjusted under 35 U.S.C. 154(b) by 143 days.

(21) Appl. No.: 16/273,290

(22) Filed: Feb. 12, 2019

(65) Prior Publication Data
US 2019/0249840 A1 Aug. 15, 2019

Related U.S. Application Data

(60) Provisional application No. 62/629,790, filed on Feb. 13, 2018.

(51) Int. Cl.
| | |
|---|---|
| *B60Q 1/26* | (2006.01) |
| *B60Q 1/46* | (2006.01) |
| *F21S 41/19* | (2018.01) |
| *F21S 41/141* | (2018.01) |

(52) U.S. Cl.
CPC ............ *F21S 41/19* (2018.01); *B60Q 1/2696* (2013.01); *B60Q 1/46* (2013.01); *B60Q 2900/10* (2013.01); *F21S 41/141* (2018.01)

(58) Field of Classification Search
CPC ....... B60Q 1/52; B60Q 1/2696; B60Q 1/2607
USPC ......................................................... 362/542
See application file for complete search history.

(56) References Cited

U.S. PATENT DOCUMENTS

| | | | |
|---|---|---|---|
| 6,367,949 B1 | 4/2002 | Pederson | |
| 6,380,865 B1 | 4/2002 | Pederson | |
| 6,700,502 B1 | 3/2004 | Pederson | |
| 8,138,941 B2* | 3/2012 | Smith | F21S 45/48 |
| | | | 362/800 |
| 9,168,863 B2* | 10/2015 | Piersing | G08B 5/36 |
| 9,677,731 B2* | 6/2017 | Weiss | F21S 43/14 |
| 2008/0037262 A1 | 2/2008 | Wesson | |

* cited by examiner

*Primary Examiner* — William J Carter
(74) *Attorney, Agent, or Firm* — Warner Norcross + Judd LLP

(57) ABSTRACT

A concealed lighthead is provided. The concealed lighthead is sized to replace existing socket assemblies for a headlight or a taillight, and is operable in an indicator mode and an emergency mode. The concealed lighthead also includes an override mode in which the emergency lights are temporarily interrupted by operation of the indicator lights. The concealed lighthead includes an adapter for use among different headlights and taillights and includes a lens assembly that provides up to 360 degrees of coverage as an indicator light or emergency light.

14 Claims, 7 Drawing Sheets

CONCEALED LIGHTHEAD WITH INDICATOR OVERRIDE

CROSS-REFERENCE TO RELATED APPLICATION

This application claims the benefit of U.S. Provisional Application 62/629,790, filed Feb. 13, 2018, the disclosure of which is incorporated by reference in its entirety.

FIELD OF THE INVENTION

The present invention generally pertains to concealed LED lightheads for emergency vehicles.

BACKGROUND OF THE INVENTION

Emergency vehicles are generally required to include warning lights that provide an emergency flash pattern or strobe effect. Concealed lightheads (also called hideaway lights) are a category of warning lights that are contained within the headlight housing and the taillight housing. For example, concealed lightheads for police vehicles can include an array of red, blue, white, and amber LEDs for outputting an emergency flash pattern. When not in use, the concealed lighthead is only visible upon close inspection of the headlight or the taillight.

Upfitters of emergency vehicles routinely modify existing headlight housings and taillight housings to include concealed lightheads. Installation is achieved by drilling a 1" hole through the rear of the housing to provide an aperture in a mounting surface. The concealed lighthead is inserted through the aperture and secured to the mounting surface using predominantly silicone to hold the lighthead in place. Electrical wires extend from the rear of the concealed lighthead to a DC input, a DC output, and a control input, and the perimeter of the aperture is coated with a bead of silicone.

However, this modification can require a significant investment of time and can degrade the reliability of the headlights and the taillights. In addition, this modification, and in particular the step of drilling through the housing, will typically void the manufacturer's warranty for the headlights and the taillights. The application of silicone (or other sealant) around the perimeter of the aperture cannot guarantee the absence of debris and moisture within the headlight and taillight housings. In addition, concealed lightheads provide a brighter output than the pre-existing lights in the headlight housing and the taillight housing. For example, concealed lightheads provide a brighter output than incandescent turn indicator bulbs, brake indicator bulbs, and reverse indicator bulbs, making it difficult for other drivers to perceive the various indicator lights of the emergency vehicle when the concealed lightheads are in function.

It would therefore be beneficial to provide an improved concealed LED lighthead for upfitters of emergency vehicles. In particular, it would be beneficial to provide an improved concealed LED lighthead that can be easily installed in existing headlights and taillights from multiple different manufacturers, that does not optically overwhelm conventional indicator functions, that does not void the manufacturer's warranty, and that requires a minimal investment of labor and time.

SUMMARY OF THE INVENTION

An improved concealed lighthead is provided. The concealed lighthead is sized to replace original equipment manufacturer (OEM) indicator lights (e.g., headlights, brake lights, turn indicator lights, reverse lights) and includes at least two modes of operation: an indicator mode and an emergency mode. The concealed lighthead also includes an override mode in which the emergency mode is temporarily interrupted by operation of the indicator mode. The concealed lighthead includes an adapter for use among headlights and taillights from various manufacturers and includes a lens assembly that provides up to 360 degrees of coverage. By positioning the lighthead in the same position as the original indicator light, the present invention meets US DOT requirements for headlights and taillights, and its flashing function meets SAE requirements for emergency vehicle warning lights. Additionally, the concealed lighthead can be installed with a minimal investment of labor and time and without voiding the manufacturer's warranty on the headlight/taillight.

In one embodiment, the concealed lighthead is configured for an existing opening for an indicator light socket assembly. The concealed lighthead includes multiple LEDs (e.g., red, blue, white, and amber) and a lens assembly for shaping the optical output of the LEDs. Once activated in an emergency mode, the LEDs provide an emergency flash pattern. The emergency flash pattern stops or dims with activation of the indicator mode. Once the indicator mode is deactivated, the emergency flash pattern returns to full intensity.

In another embodiment, the concealed lighthead is installed with the removal of an existing indicator light socket assembly from the headlight or taillight housing. The concealed lighthead is then fitted into the same opening for the indicator light socket assembly and is electrically coupled to a control box within the vehicle interior. Alternatively, the concealed lighthead is electrically connected to the existing vehicle wiring harness. Once installed, the concealed lighthead is sealed from the exterior environment through compression of an o-ring and is positioned in the lamp reflection cups of the headlight or taillight housing. As noted above, the concealed lighthead operates as an indicator light and as an emergency light with an override mode during application of an indicator function (e.g., turn, brake, reverse).

In another embodiment, the concealed lighthead is interoperable as a headlight, a brake light, a turn indicator light, and a reverse light. The concealed lighthead is adapted to provide the appropriate indicator function based on the control input from the vehicle wiring harness. In other words, the concealed lighthead is pre-programmed with multiple indicator modes and is adapted to select the appropriate pre-programmed indicator mode by reading the control input (e.g., a series of signal pulses) from the vehicle wiring harness. In this respect, installation is greatly simplified as a single concealed lighthead can be used for each exterior vehicle light, while also avoiding the potential for a lighthead being installed in the wrong position.

These and other advantages and features of the invention will be more fully understood and appreciated by reference to the drawings and the description of the current embodiments.

DESCRIPTION OF THE CURRENT EMBODIMENT

Figure 1:
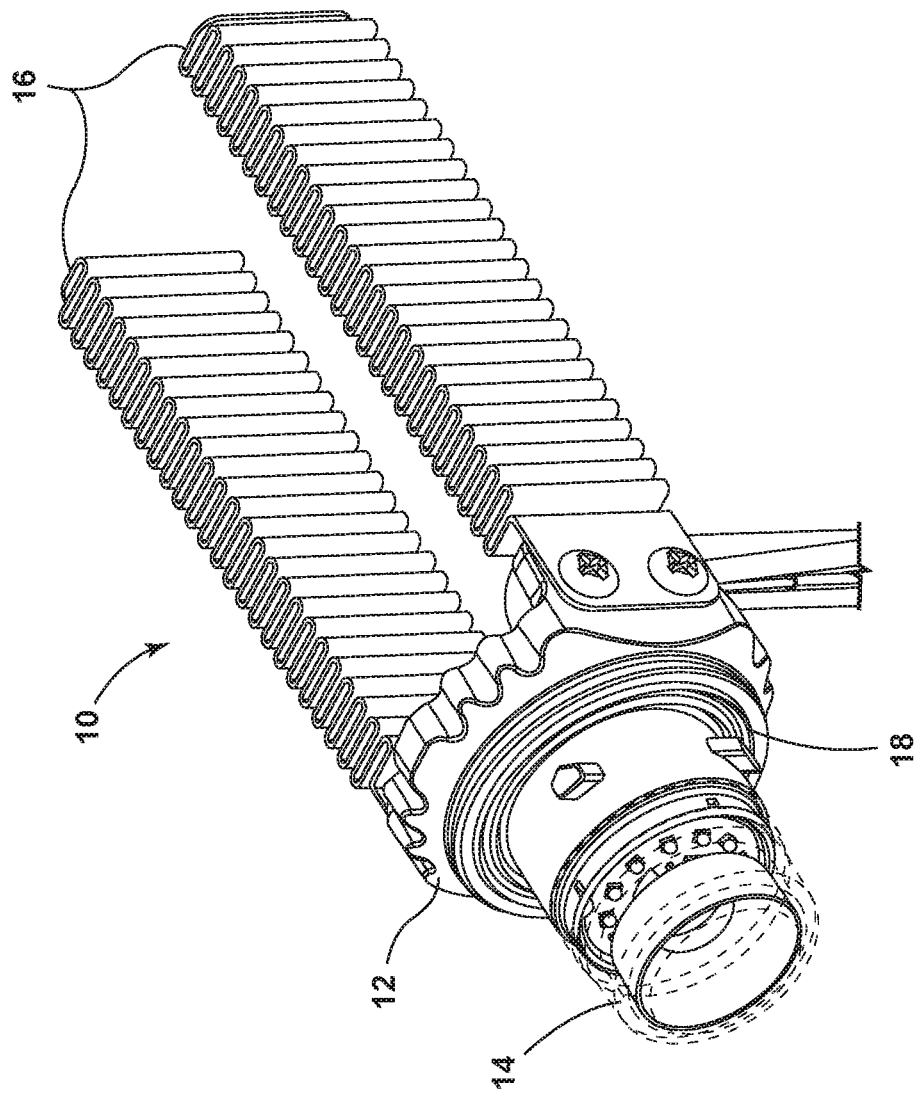
FIG. 1 includes a perspective view of a concealed lighthead in accordance with one embodiment.

A concealed lighthead in accordance with the current embodiment is depicted in FIG. 1 and generally designated 10. The concealed lighthead 10 includes a light assembly 12, a lens assembly 14, heat sinks 16, and an o-ring 18. As discussed below, the concealed lighthead 10 is adapted to be received within an opening for an existing socket assembly and includes multiple modes of operation, including indicator modes and emergency modes. In this position, the optical output of the headlight or the taillight is maintained for all indicator modes and is adapted to select the appropriate indicator mode by reading the control input from the vehicle.

Figure 3:
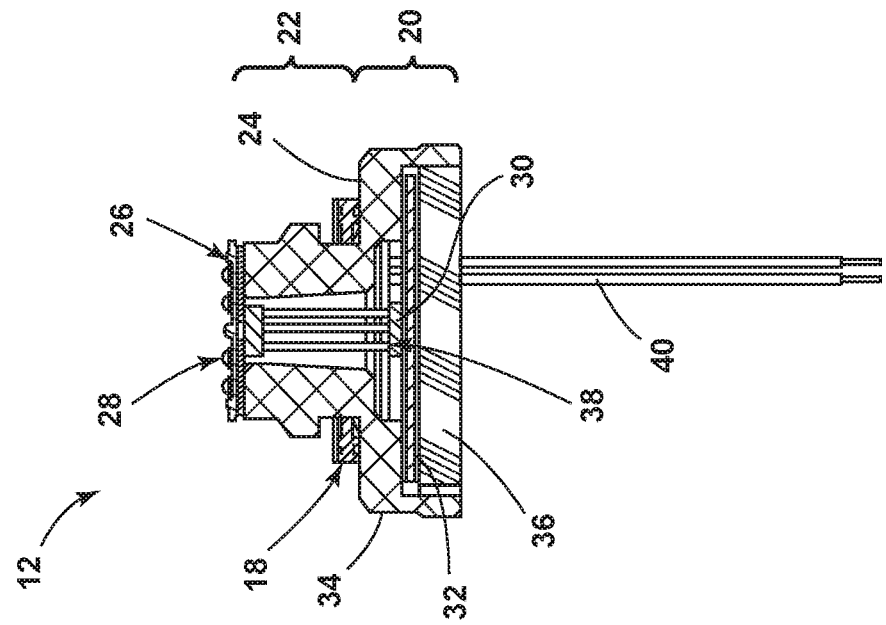
FIG. 3 includes a cross-sectional view of the LED light assembly taken along line A-A of FIG. 2.
Figure 2:
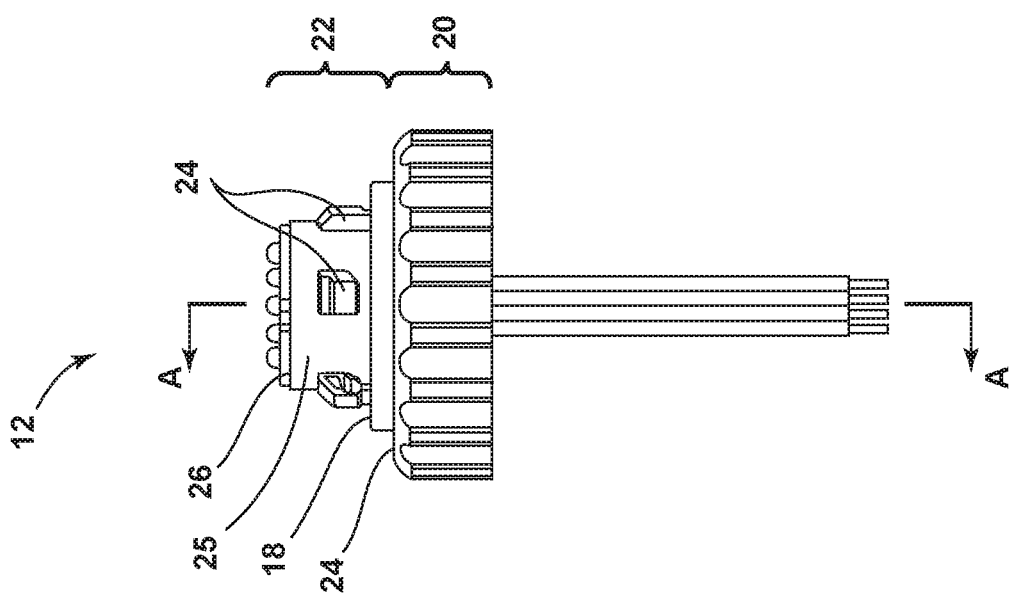
FIG. 2 includes a side elevation view of the LED light assembly of the concealed lighthead of FIG. 1.

As best shown in FIGS. 2-3, the light assembly 12 includes a cylindrical aluminum body comprising a lower portion 20 and an upper portion 22. The lower portion 20 includes an annular disc 24 for compressing the o-ring 18 against the headlight or taillight housing. The upper portion 22 includes a plurality of annular locking flanges 24 extending radially from a cylindrical sidewall 25 of the light assembly 12. The locking flanges 24 imitate the locking flanges for an existing socket assembly. The light assembly 12 also includes a plurality of LEDs 28 mounted to a printed circuit board (PCB) 26. The PCB 26 includes sixteen LEDs in the current embodiment, including four white LEDs, four amber LEDs, four red LEDs, and four blue LEDs, but can include greater or fewer LEDs in other embodiments. As discussed below in connection with FIG. 9, a controller 30 causes certain of the plurality of LEDs 28 to illuminate in an indicator mode (e.g., reverse, turn, or brake) and causes the emergency LEDs to illuminate in an emergency mode with an emergency flash pattern. The controller 30 also provides an override mode. In the override mode, the emergency flash pattern stops or dims. Once the indicator mode is deactivated, the emergency flash pattern returns to full intensity.

Figure 4:
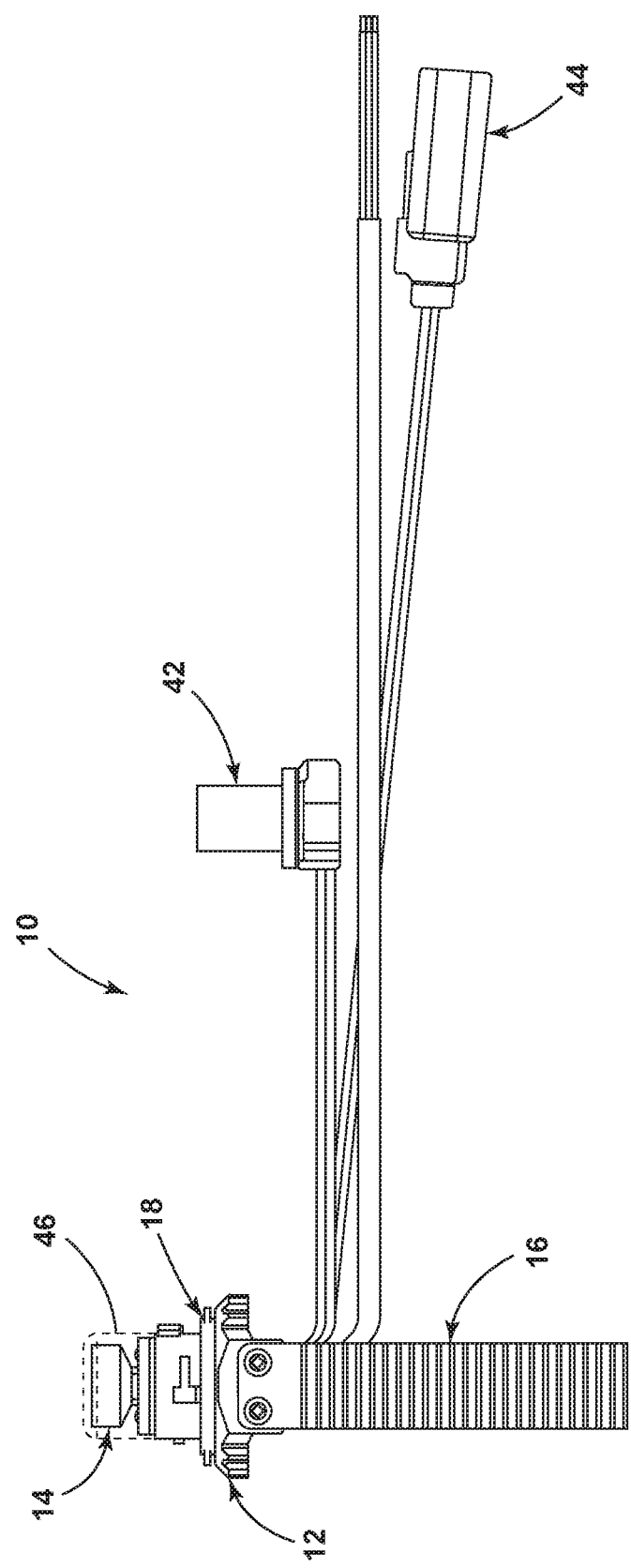
FIG. 4 includes a side elevation view of the concealed lighthead of FIG. 1 illustrating the heat sink and wiring harness.

As also shown in FIG. 3, the light assembly 12 includes a main PCB 32 for the controller 30. The light assembly 12 includes a thermal conductive silicone 34 about the circumference of the main PCB 32 and includes a glue seal 36. The main PCB 32 additionally includes a 3×2 pin header 38 and a plurality of power/data cables 40 for an indicator input connector 42 and an emergency input connector 44, shown in FIG. 4, the indicator input connector 42 being adapted to receive a control input (e.g., a pulse-width-modulated control signal). As also shown in FIG. 4, each heat sink 16 extends from the aluminum body for drawing heat from the light assembly 12. The lens assembly 14 is joined to the light assembly 12 and includes an outer annular surface 46 for radiating light in a toroidal pattern from within the lamp reflection cup of a headlight or taillight housing. The lens assembly 14 is formed from an optical-grade plastic in the present embodiment, but can be formed from other materials in other embodiments. The lens assembly 14 is positioned on the PCB 26, optionally by gluing the lens assembly 14 to the PCB 26. The o-ring 18 fits around the lens assembly 14 and the upper portion of the light assembly 12 for sealing the interior of the headlight or taillight housing.

Figure 6:
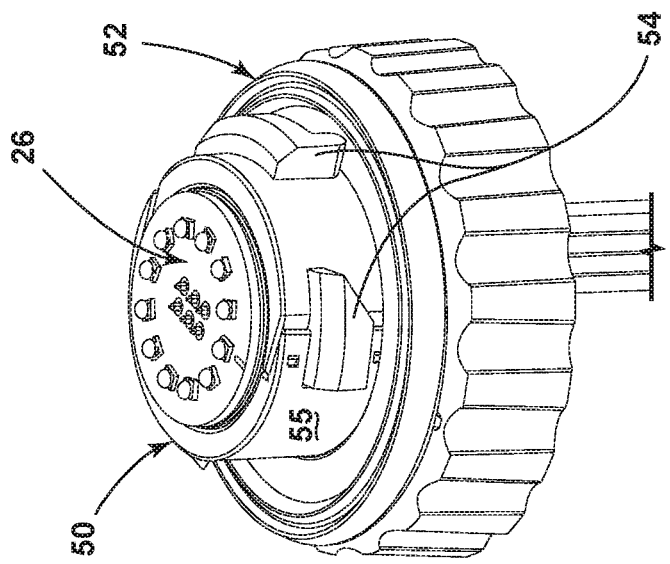
FIG. 6 includes a perspective view of the concealed lighthead of FIG. 1 including the adapter and o-ring of FIG. 5.
Figure 5:
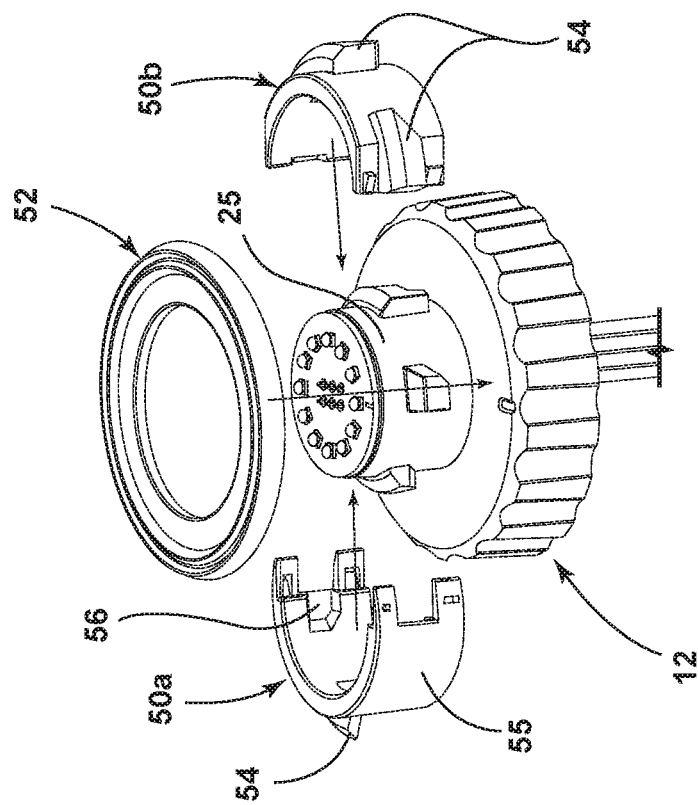
FIG. 5 includes an exploded view of an adapter and o-ring for the concealed lighthead of FIG. 1.

In the embodiment shown in FIGS. 5-6, the light assembly 12 includes a two-piece adapter ring 50 and a corresponding o-ring 52. The adapter ring 50 and the o-ring 52 are sized to replicate a different socket assembly, such that the concealed lighthead 10 can be used with a wide range of vehicle makes and models. In the illustrated embodiment, the adapter ring 50 includes a two-piece construction including a first portion 50a and a second portion 50b that interlock by snap-fit or bayonet fit. Each of the first portion 50a and the second portion 50b includes at least one annular locking flange 54 extending radially from the adapter ring 50. The interior curved sidewall of the adapter ring 50 includes a plurality of notches or grooves 56 that are sized to extend around the annular locking flanges 24 of the light assembly 12. The o-ring 52 is sized to extend around the curved cylindrical sidewall 55 of the adapter ring 50. As shown in FIG. 5, the o-ring 52 is inserted over the light assembly 12 prior to snap-fitting the first portion 50a of the adapter ring 50 to the second portion 50b of the adapter ring 50, with the final construction being shown in FIG. 6.

Figure 7:
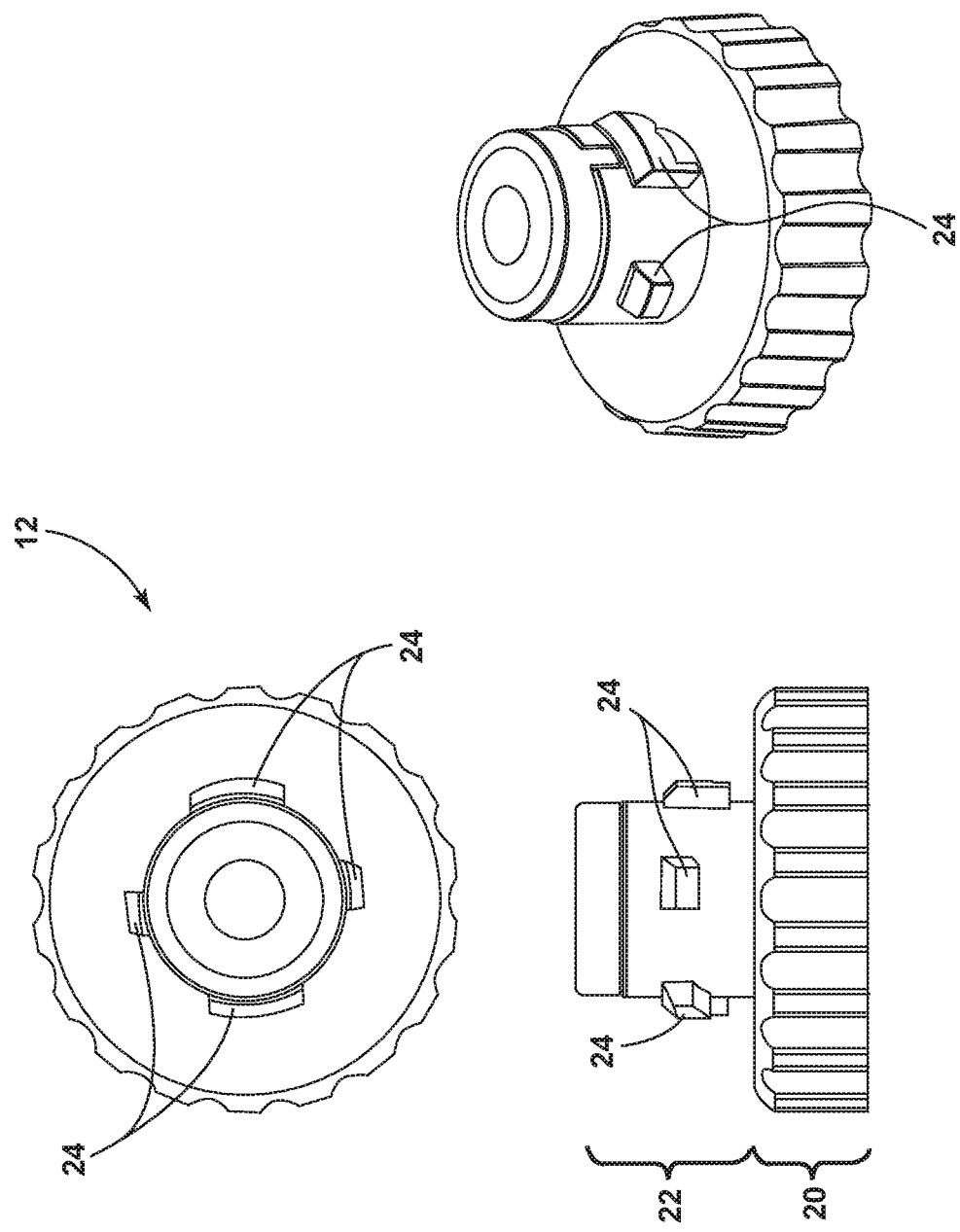
FIG. 7 includes top, side, and perspective views of a concealed lighthead in accordance with another embodiment.
Figure 8:
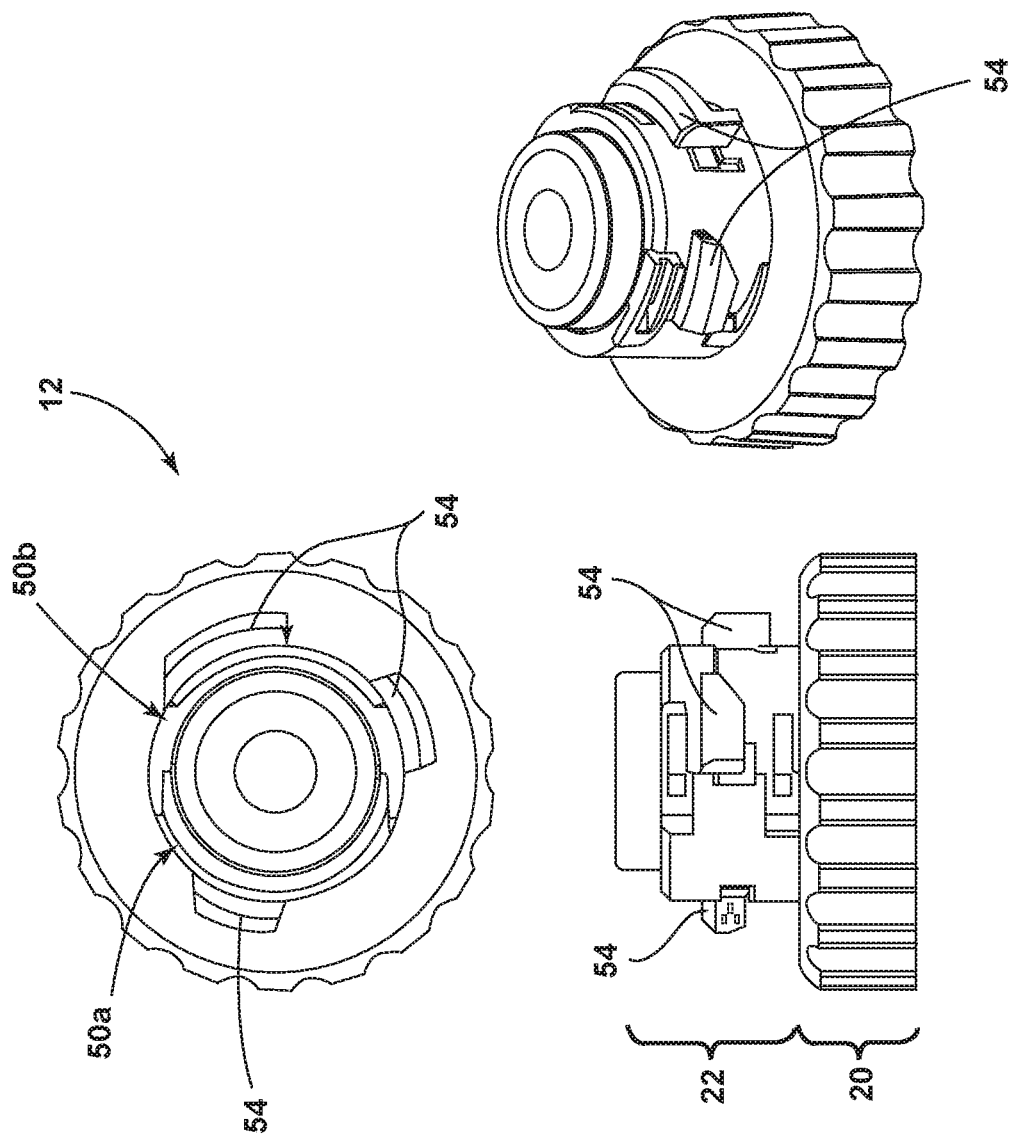
FIG. 8 includes top, side, and perspective views of the concealed lighthead of FIG. 7 including a two-piece adapter ring.

A concealed lighthead in accordance with another embodiment is also depicted in FIGS. 7 and 8. As discussed above in connection with FIGS. 5 and 6, the concealed lighthead 10 includes a two-piece adapter ring 50 that enables a single concealed lighthead to be used across vehicle platforms for multiple manufacturers. The adapter ring 50 fits around the upper portion 22 of the light assembly 12, having an inner diameter that is generally equal to the outer diameter of the upper portion 22 of the light assembly 12. The adapter ring 50 includes three annular locking flanges 54 that are approximately equidistant from each other, being spaced about 120 degrees from each other about the circumference of the adapter ring 50. Consequently, a single concealed lighthead can be manufactured in high volumes with multiple different adapter rings 50 for use among vehicles from various manufacturers.

Installation of the concealed lighthead 10 follows the removal of the OEM factory light from the headlight (or taillight) housing. Once the OEM factory light is removed, the light assembly portion 12 of the concealed lighthead 10 is inserted into the existing opening and rotated in a clockwise manner until the annular locking flanges 24 engage corresponding recesses. In some embodiments, the installation may require fitting the two-piece adapter ring 50 and o-ring 52 onto the light assembly portion 12 prior to its insertion into the existing opening. The indictor input connector 42 is securely mated to the existing OEM harness, and the emergency input connector 44 is connected to an LED flasher module, which in turn is connected to an in-car switch panel. These steps are repeated for the remaining headlight (or taillight). The LED flasher module is ground connected and a control wire connects the LED flasher module to the in-car switch panel.

In the current embodiment, the concealed lighthead 10 is a universal aftermarket lighthead in that it provides multiple indicator lights, including a red-stop indicator light for a taillight, an amber-turn indicator light for a headlight or a taillight, and a white-reverse indicator light for a taillight.

The concealed lighthead 10 is adapted to provide the appropriate indicator function by reading the control input (e.g., signal pulses) from the pre-existing vehicle wiring harness. In particular, the controller 30 is adapted to compare one or more characteristics of the vehicle control input (e.g., duty cycle, pulse width) with information stored to computer readable memory and thereby correlate the control input with the appropriate indicator function. In this respect, installation is greatly simplified, and a single concealed lighthead 10 can be used regardless of its position on the vehicle.

Figure 9:
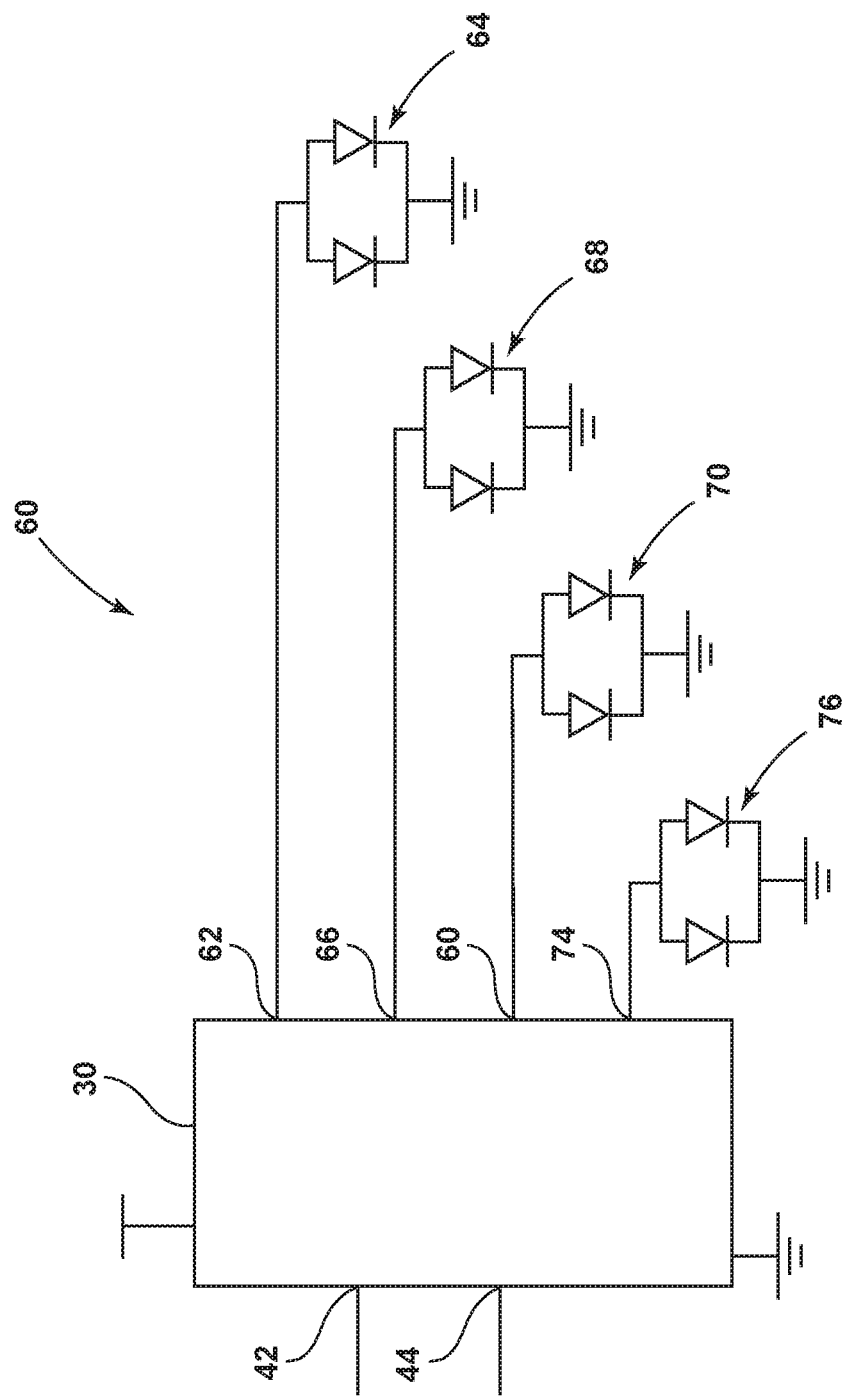
FIG. 9 includes a circuit diagram for selectively activating the LEDs of the concealed lighthead of FIG. 1.

An exemplary circuit 60 for the plurality of LEDs 28 is shown in FIG. 9. The circuit 60 includes a controller 30 having a first PWM output 62 for a first plurality of LEDs 64 (e.g., white), a second PWM output 66 for a second plurality of LEDs 68 (e.g., amber), a third PWM output 70 for a third plurality of LEDs 72 (e.g., red), and a fourth PWM output 74 for a fourth plurality of LEDs 76 (e.g., blue), each being of a different color. The controller 30 controls the activation/deactivation and the intensity of the individual LEDs by varying the duty cycle at each output 62, 66, 70, 74 in accordance with the desired emergency flash pattern or indicator mode. The controller 30 also includes an indicator input connector 42 and emergency input connector 44. Based on the signal received at the indicator input connector 42, for example by comparing the signal at the indicator input connector 42 to a look-up table stored to computer readable memory, the controller 30 is adapted to select the appropriate pre-programmed indicator mode from among multiple possible indicator modes (e.g., reverse, turn, or brake). The controller 38 is therefore adapted to correlate the input signal at the indicator input connector 42 with an appropriate indicator mode with reference to a look-up table stored to computer readable memory at the controller 38.

The concealed lighthead 10 also provides multiple emergency flash patterns, which can be pre-programmed in the controller 30 or programmed by the upfitter before installation. For example, the concealed lighthead 10 can provide more than ten selectable flash patterns involving red, blue, white and/or amber LEDs. Once activated, the emergency flash patterns continue unless interrupted by an indicator light. In the current embodiment, the controller 30 temporarily stops or dims the emergency flash pattern concurrently with activation of the indicator light. Once the indicator light is deactivated, the controller 30 causes the emergency flash pattern to resume or return to full intensity. In this respect, the indicator lights are visible to other drivers due to the temporary override of the emergency flash pattern. For example, the emergency flash pattern temporarily stops or dims while the brake lights are illuminated, such that nearby drivers are alerted to the braking of the emergency vehicle. Further by example, the emergency flash pattern temporarily stops or dims while the amber turn indicators or white reverse lights are illuminated, such that nearby drivers are appropriately alerted.

The above description is that of current embodiments of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A concealed lighthead for an emergency vehicle, the concealed lighthead comprising:
    a light assembly including a cylindrical body and a plurality of LEDs of at least two different colors on a substrate, the light assembly being operable as an emergency light and as an indicator light;
    a light transmissive cover joined to the cylindrical body and defining an enclosure for the plurality of LEDs;
    an adapter ring including a first portion and a second portion that interlock with each other around the cylindrical body, the first portion and the second portion each including at least one locking flange projecting radially outward therefrom to secure the light assembly to an existing opening for a turn light, a brake light, or a reverse light; and
    a controller housed within the light assembly and in electrical communication with the plurality of LEDs, the controller being configured to cause the plurality of LEDs to illuminate in accordance with an emergency flash pattern as an emergency light and configured to cause the plurality of LEDs to illuminate in accordance with one of at least two visually distinct indicator light signals as an indicator light, wherein the controller includes an override mode in which the emergency flash pattern is interrupted in response to activation of the indicator light.

2. The concealed lighthead of claim 1 wherein the controller is operable to detect installation as a replacement brake light, a replacement turn indicator light, and a replacement reverse light.

3. The concealed lighthead of claim 1 wherein the emergency flash pattern includes at least two different types of visually distinct warning light sequences.

4. The concealed lighthead of claim 1 wherein the cylindrical body defines an exterior surface, the plurality of LEDs being arranged atop the exterior surface.

5. The concealed lighthead of claim 1 further including an o-ring positioned around the cylindrical body and including an annular disc joined to a lower portion of the cylindrical body for compressing the o-ring against a headlight housing or a taillight housing.

6. The concealed lighthead of claim 1 further including a heat sink joined to the light assembly and extending therefrom.

7. The concealed lighthead of claim 1 wherein the controller is operable to vary the duty cycle of a pulse-width-modulated voltage to the plurality of LEDs.

8. A concealed lighthead for an emergency vehicle headlight or taillight comprising:
    a light assembly that is sized to be received within an opening for an existing indicator light, the light assembly including a cylindrical body and a plurality of LEDs of at least two different colors;
    a light transmissive cover positioned atop the cylindrical body, the light transmissive cover defining an enclosed spaced surrounding the plurality of LEDs;
    an adapter ring including a first portion and a second portion that interlock with each other around the cylindrical body, the first portion and the second portion each including at least one locking flange projecting radially outward therefrom to secure the light assembly to an existing opening for a turn light, a brake light, or a reverse light; and
    a controller housed within the light assembly and configured activate the plurality of LEDs according to one of a plurality of indicator modes including a turn indicator mode, a brake indicator mode, and a reverse indicator mode, the controller being further configured to activate the plurality of LEDs according to an emergency mode with an emergency flash pattern, wherein the emergency mode is temporarily interrupted by activation of the indicator mode such that the plurality of LEDs alternate function as emergency lights and as indicator lights;

wherein the optical output of the headlight or taillight having the concealed lighthead is substantially identical to the optical output of the headlight or taillight having the existing indicator light.

9. The concealed lighthead of claim 8 wherein the controller is operable to select one of the plurality of indicator modes based on a control input to the concealed lighthead.

10. The concealed lighthead of claim 8 wherein the plurality of LEDs are arranged atop the cylindrical body and the controller is housed within the cylindrical body.

11. The concealed lighthead of claim 8 further including an o-ring positioned around the cylindrical body, the light assembly further including an annular disc joined to a lower portion of the cylindrical body for compressing the o-ring against a headlight housing or a taillight housing.

12. The concealed lighthead of claim 8 further including a heat sink joined to the light assembly and extending therefrom.

13. The concealed lighthead of claim 8 wherein the emergency flash pattern includes at least two different types of visually distinct warning light sequences.

14. The concealed lighthead of claim 8 wherein the controller is operable to vary the duty cycle of a pulse-width-modulated voltage to the plurality of LEDs.

* * * * *